F. N. CONNET.
INTEGRATING DEVICE AND RECORDING MANOMETER.
APPLICATION FILED APR. 3, 1907.
920,025.
Patented Apr. 27, 1909.
2 SHEETS—SHEET 1.
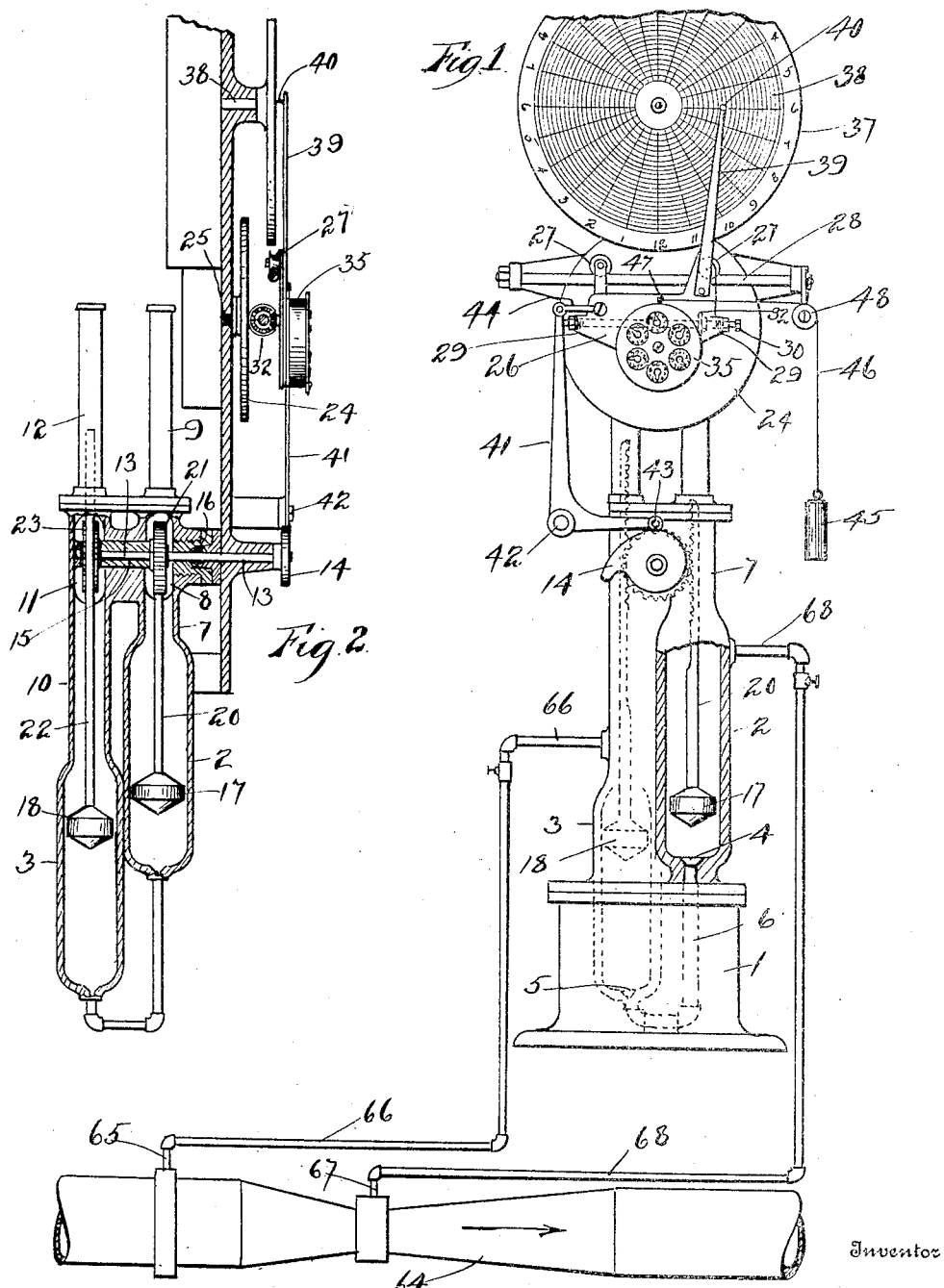
Witnesses
E. J. Ogden
A. L. Makepeace
Inventor
Frederick N. Connet.
By
Howard E. Barlow
Attorney

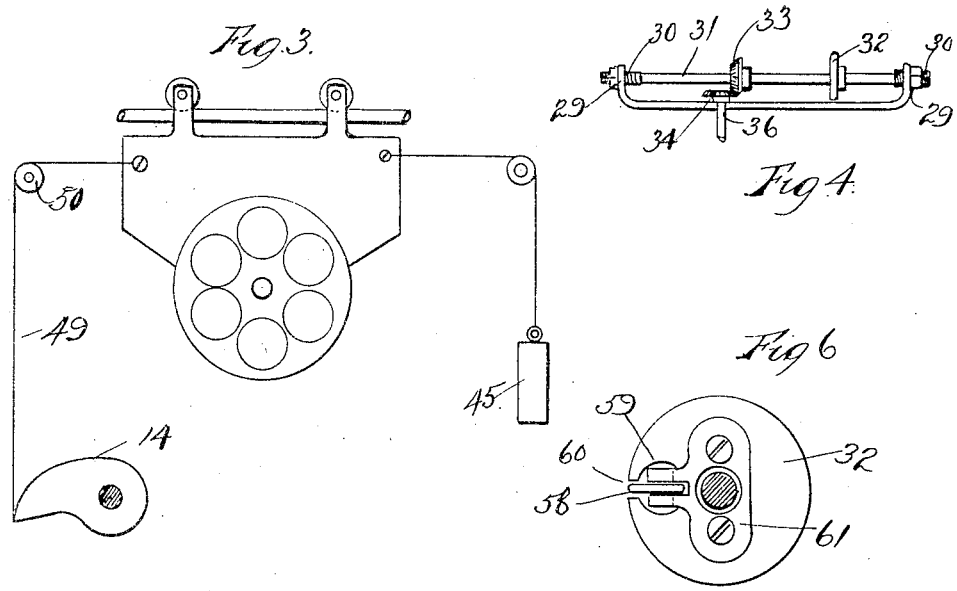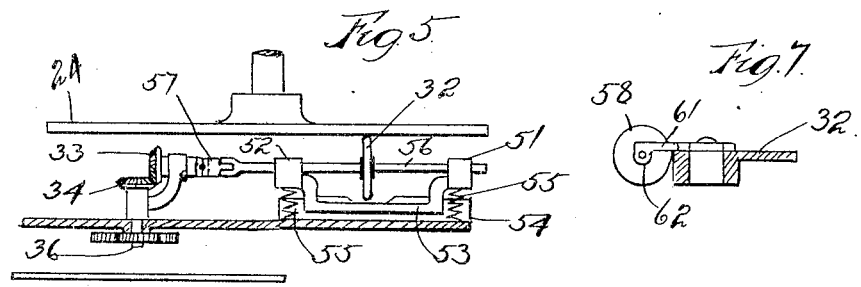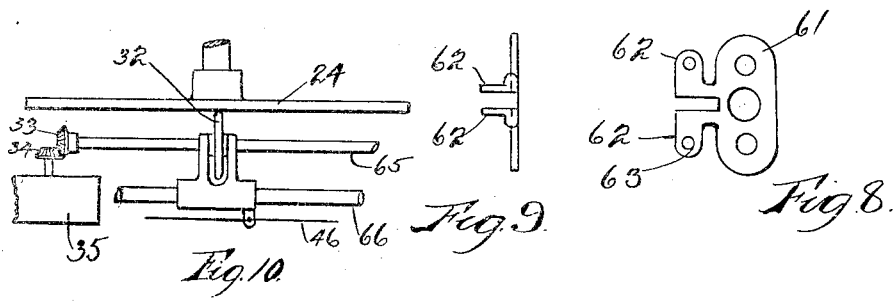

UNITED STATES PATENT OFFICE.

FREDERICK N. CONNET, OF PROVIDENCE, RHODE ISLAND.

INTEGRATING DEVICE AND RECORDING-MANOMETER.

No. 920,025.  Specification of Letters Patent.  Patented April 27, 1909.

Application filed April 2, 1907. Serial No. 366,033.

*To all whom it may concern:*

Be it known that I, FREDERICK N. CONNET, a citizen of the United States, residing at the city of Providence, in the county of Providence and State of Rhode Island, have invented certain new and useful Improvements in Integrating Devices and Recording-Manometers, of which the following is a specification, reference being had therein to the accompanying drawing.

This invention relates to the combination of an integrating device and a recording manometer, and has for its object to provide an instrument of simple and practical construction that will automatically give the sum and total in gallons, cubic feet or other convenient units of measure, of the quantity of liquids or gases that has passed through a given aperture and at the same time record the variation of the flow so that the rate at any period may be readily ascertained.

The apparatus is particularly adapted to register the rate of flow through a pipe or tube similar in construction to that commonly known as the "Venturi tube", described in United States Patent No. 381,373, April 17, 1888, and the said device may be actuated by any desirable mechanism, but for convenience I have shown two chambers connected to said tube one communicating with the up-stream or high pressure side of the tube, and the second chamber communicating with the throat or reduced portion of said tube. These chambers communicate with each other, and in each is a float supported on a column of mercury, said floats being connected through suitable mechanism to operate the integrating mechanism, and also to move a recording pen over the face of a continuously rotating record sheet.

This invention is fully set forth in this specification and more particularly pointed out in the appended claims.

In the drawings: Figure 1— is a front elevation of my integrating and recording device connected up to a "Venturi" tube, showing one of the chambers partially in section and the recording device operating mechanism. Fig. 2— is a side elevation of the instrument partly in section. Fig. 3— shows the integrating carriage and a flexible connection to the same, whereby it may be actuated by an oscillating cam. Fig. 4 is an edge view of the integrator carriage show-
ing the contact roll and driving gears mounted hereon. Fig. 5— shows the rotatable driving plate and the contact wheel in engagement with the same, which operates the counting device, said contact wheel being flexibly connected to the counting shaft whereby said wheel may be moved up into contact with said plate without moving the counter. Fig. 6— is a face view of the contact wheel showing a smaller or auxiliary contact wheel mounted therein, so that the periphery of the said auxiliary wheel will coincide with the circumferential line of the said contact wheel. Fig. 7— is an edge view of the contact wheel showing the position of the auxiliary wheel therein. Fig. 8— shows a little bracket in which the auxiliary wheel is mounted, said bracket being flattened out as it is struck from the sheet stock. Fig. 9— is an edge view of the said bracket with its ears turned down in position to receive the auxiliary wheel. Fig. 10— shows a modification in which the contact wheel is moved along on the rod 65 on the guide rod 66 over the face of the driver 24, the counter 35 remaining stationary.

Referring to the drawings at 1 is the base or frame of the manometer on which is supported a pair of cylinders 2 and 3, cylinder 2 being set somewhat higher than cylinder 3. At the lower end of each of these cylinders is a tapered aperture 4 and 5 communicating with the pipe 6 by which pipe the two cylinders are connected together. The upper end of cylinder 2 is provided with a short neck 7 communicating with the circular opening 8 and a stand-pipe 9 extends upward from said opening in line with its neck 7, making the whole cylinder self-contained and watertight. The cylinder 3 is provided with a long neck 10 communicating with a circular chamber 11 corresponding to and in line horizontally with the circular chamber 8, and a stand-pipe 12 extends upward from the opening 11 in line with its neck 10, making this cylinder also tight against a pressure of water.

At 13 is a horizontal shaft extending from the circular chamber 11 through the circular chamber 8 and into the record casing, not shown, the actuating cam 14 being mounted on this end. This shaft is provided with a suitable bearing 15 between the two chambers and a stuffing box 16 as it passes from the circular chamber 8 into the record casing. A gear 21 located in this chamber 8 is mounted on and fixed to this shaft, and a similar gear 23 located in chamber 11 is also mounted on and fixed to this same shaft.

At 17 and 18 are two floats adapted to rest on and be moved vertically by the change in the levels of the mercury in both of the cylinders. To the upper end of float 17 is connected a long rack 20 adapted to engage one side of the gear 21, while to the float 18 is also connected a similar rack 22 adapted to engage the opposite side of the gear 23. When either of the floats is way up the rack extends into its stand-pipe and when the float is way down the bottom of the same rests upon the lower end of its cylinder.

At 24 is a disk or driver mounted on the shaft 25 to be rotated continuously by clock work or other convenient mechanism, not shown. A carriage 26 is mounted on wheels 27—27 to move laterally across the face of said disk 24 on the bar 28. This carriage is provided with rearwardly extending ears 29—29, see Fig. 4, through which ears bearing screws 30—30 are threaded. Rotatably mounted in these bearing screws is the small shaft 31 on which the contact wheel 32 is fixed. Also mounted on this shaft is the small beveled gear 33 which meshes with a similar gear 34, this latter gear being arranged to drive the hands of the counter 35 by suitable gearing, not shown, through the shaft 36. Above this counter actuating disk 24, is a record sheet disk 37, the same being mounted on the shaft 38 to be continuously rotated by a clock or other convenient mechanism not shown. On this disk is mounted a record sheet 38ª which may be ruled or arranged in any convenient manner, the one shown being divided into twenty-four equal parts by radial lines, representing the twenty-four hours of the day, the same is also marked with a plurality of concentric circles representing a definite number of gallons, or other units of measure which may be adopted.

At 39 is an upwardly extending arm attached at its lower end to the carriage 26, the upper end of this arm is arranged to receive a recording pen 40.

At 41 is a knee lever pivoted to the framework at 42. On the outer end of the horizontal arm of this lever is a contact roll 43 which engages the edge of the actuating cam 14. The upper end of the upright arm is connected to the carriage 26 through the connecting rod 44, the said actuating cam being adapted to move the carriage to the left, said carriage being moved in the opposite direction by means of the weight 45 through the cord 46, which is attached to said carriage at 47 and led over the pulley 48. As illustrated in Fig. 3 this carriage may be moved by the cam 14 through a flexible connection 49, if desired, which in some cases may prove an advantage over the knee lever shown in Fig. 1.

It is found in practice that the sliding of the contact wheel along the face of the rotating plate has a tendency to wear the periphery of the wheel, and that it is of practical advantage to provide means whereby this contact wheel may be pressed against the surface of the plate to automatically take up the wear of the same. This may be accomplished in any desired manner but for convenience I have shown two bearings 51 and 52 mounted on the bar 53 in the guide plate 54, the same being pressed forward by the springs 55—55. In these bearings is mounted the shaft 56 on which is fixed the contact roll 32. One end of this shaft is flexibly connected at 57 to the bevel gears 33 and 34.

An essential feature of my device is the construction of the contact wheel whereby the same is caused to move more easily across the face of the contact plate. This is accomplished by mounting an auxiliary wheel 58 in the main contact wheel, the same being set at right angles to said main wheel, whereby the periphery of said auxiliary wheel will come on the circumferential line of said contact wheel. In setting this auxiliary wheel into the contact wheel I preferably form an aperture 59 in said wheel which communicates with the periphery of the same through the slot 60, the auxiliary wheel being mounted on a bracket 61 to set into said aperture. This bracket may be stamped out of sheet metal having ears 62—62 pierced at 63, said ears being adapted to be bent down into the form best illustrated in Fig. 9, into which the auxiliary wheel is readily mounted. I have shown a contact wheel with but one auxiliary wheel mounted therein, but any desired number of these auxiliary wheels may be located around the periphery of said main wheel to facilitate the movement of the same across the face of the driving plate.

In the operation of this device the liquids or gases flow through the tube 64 in the direction of the arrow. The up-stream side of the tube is connected at 65 by means of pipe 66 to the cylinder 3, while the throat is connected at 67 by the pipe 68 to the cylinder 2. When there is no flow through the tube the pressure at all points of the tube is, of course, equal and the floats in both cylinders are at the same height. As soon as the flow begins the pressure in the throat is decreased and becomes less than that at the point 65, therefore the mercury in chamber 3 is forced downward by the excess of pressure on this side, raising the mercury and float in the opposite chamber a corresponding amount. As these floats move one up and one down they act with corresponding force through their respective racks and gears on the shaft 13 to rotate the actuating cam 14 in proportion to their movement. When there is no flow through the tube the meter operating contact wheel 32 is at the center of the rotating disk 24 where it will not turn, and the marking pen 40 is at the zero point on its record sheet. As soon as the flow begins the floats change their relative levels causing the cam to rotate and allow the carriage to be moved to the right by means of the counterbalance weight 45, carrying the contact wheel from the center of the disk along the face of the same where it receives a rotary motion at a speed in proportion to its distance from the center of the plate. The greater the velocity of the water through the tube the greater the movement of the carriage, and the faster the meter is driven, the recording finger being also carried a corresponding distance from the center of its disk. The integrating mechanism shows at a glance the total amount that has passed through the tube and the rate, whether constant or varying, is clearly and accurately recorded on the record sheet for a predetermined period. These sheets when operated upon by the mechanism described should be removed and replaced by a fresh one every twenty-four hours. The integrating mechanism keeps on adding from day to day, and shows at all times the total quantity used.

Having thus described my invention, what I claim as new and desire to secure by Letters Patent, is:

1. In a liquid meter, a counter, a rotatable driver, a tracer, a pair of adjacent receptacles, a rotatable shaft adapted to pass from one receptacle into the other, and means in both receptacles adapted to act upon said shaft and cause the same to control the operation of said counter and the movement of said tracer across the face of a record sheet.

2. In a liquid meter, a counter, a rotatable driver, a tracer, a pair of adjacent receptacles, a rotatable shaft adapted to pass from one receptacle into the other, a float in each of said receptacles adapted to act upon said shaft and cause the same to control the operation of said counter and the movement of said tracer across the face of a record sheet.

3. In a liquid meter, a counter, a rotatable driver, a tracer, a pair of adjacent receptacles, a rotatable shaft adapted to pass from one receptacle into the other, a float in each of said receptacles adapted to act upon said shaft to rotate the same and a cam operated by said shaft to control the operation of said counter and the movement of said tracer across the face of a record sheet.

4. In a liquid meter, a counter, a tracer, a pair of adjacent receptacles, a rotatable shaft adapted to enter both receptacles, a float in each receptacle, and means including a rack and pinion to control the operation of said counter and the movement of said tracer over a record sheet.

5. In a device of the character described, the combination of a main supply pipe, a counter, a rotatable driver, a contact wheel, a tracer, a cam controlled by the difference between the pressures at two points in said pipe whereby said wheel is moved over the face of said driver to impart a variable speed to the counter, means in said contact wheel to facilitate its movement along the face of the driver, and means for moving said tracer over the face of a record sheet.

6. In a device of the character described, the combination of a main supply pipe, means for recording on a record sheet the amount of water which passes through said pipe, a counter, rotatable means for actuating said counter, a contact wheel arranged to engage said rotatable means, means for moving said contact wheel over the face of said rotatable means whereby a variable speed is imparted to said counter, and means in said contact wheel to facilitate the lateral movement of the same along the face of said rotatable means.

7. In a device of the character described, the combination of a main supply pipe, a rotatable plate, an integrating device actuated by the movement of said plate, a longitudinally movable carriage on which said device is mounted, a contact wheel for engaging said plate through which the integrator is rotated, means in said contact wheel to facilitate the lateral movement of the same over the face of said plate, means also mounted on said carriage for tracing on a record sheet, and means including a cam actuated by the difference between the pressure at two points in said pipe for controlling the movement of said carriage across the face of said plate.

In testimony whereof I affix my signature in presence of two witnesses.

FREDERICK N. CONNET.

Witnesses:
HOWARD E. BARLOW,
E. I. OGDEN.